United States Patent [19]

Fredriksen

[11] 4,220,457
[45] Sep. 2, 1980

[54] CLEANING APPARATUS FOR HOSE FILTERS

[76] Inventor: Knud V. Fredriksen, Jerslev Maskinfabrik A/S, Stationsvej 1, 4490 Jerslev Sj., Denmark

[21] Appl. No.: 3,796

[22] Filed: Jan. 16, 1979

[30] Foreign Application Priority Data

Jan. 16, 1978 [DK] Denmark .............................. 188/78

[51] Int. Cl.$^2$ ............................................. B01D 46/04
[52] U.S. Cl. ...................................... 55/273; 55/287; 55/302; 55/337
[58] Field of Search .................. 55/273, 283, 284–287, 55/294, 302, 337, 272; 210/411, 427

[56] References Cited

U.S. PATENT DOCUMENTS

| | | | |
|---|---|---|---|
| 1,974,952 | 9/1934 | Eiben | 55/273 |
| 2,902,113 | 9/1959 | Lühr | 55/273 |
| 3,234,714 | 2/1966 | Rymer et al. | 55/302 |
| 3,289,393 | 12/1966 | Spötta | 55/287 |
| 3,360,907 | 1/1968 | Clark, Jr. et al. | 210/411 |
| 3,841,065 | 10/1974 | Espeel | 55/283 |
| 4,022,595 | 5/1977 | Noland | 55/273 |

FOREIGN PATENT DOCUMENTS

795321  5/1958  United Kingdom ...................... 55/273
880043 10/1961  United Kingdom .

*Primary Examiner*—David L. Lacey
*Attorney, Agent, or Firm*—Edward F. Levy

[57] ABSTRACT

In an air cleaner device for removing dust or other particles from air, and including a filter system of a circular line of filter bags through the walls of which the air is forced into the interior of the bags, an apparatus for removing accumulations of filtered-out particles adhering to the outer surfaces of the filter bags by introducing a flow of cleaning air in the reverse direction into the interior of the filter bags. The particle removing apparatus includes a circular line of tubes connected to a source of cleaning air and spaced from and registering with the top ends of the filter bags. The open ends of the tubes are closed off and sealed by a sealing plate which is motor driven for slow rotation. An aperture in the sealing plate is positioned to register with the ends of the tubes so that the latter are uncovered successively as the plate rotates, permitting a flow of cleaning air to be directed into the interiors of the filter bags and dislodge the accumulation of particles on the outer walls thereof.

8 Claims, 3 Drawing Figures

CLEANING APPARATUS FOR HOSE FILTERS

The invention is concerned with a cleaning device for the hose filters of air purifying apparatus in which outside air containing dust enters a collection chamber and passes into the interior of a hose filter system through the side walls of the filter bags or sleeves contained in the apparatus, and where the filtered air flows through the cavity of the bags to a point of use. The cleaning device is of the kind in which cleaning is effected by means of the introduction, into the interior of the filter bags for a short period, of a counterflow of scavenging or cleaning air.

There already exists a cleaning apparatus of this kind, where in a pressure chamber a number of flexible members are positioned next to each other in such a way that they open and close the exits through which the scavenging or cleaning air leaves the filter bags. The flexible members are pulled by a common shaft and are individually provided with an aperture for the inlet of a short blast of scavenging air for the filter bags the moment an aperture passes an outlet for scavenging air.

The purpose of the present invention is to provide a constructively simpler and more dependable cleaning apparatus for hose filters than the cleaning apparatuses already known.

According to the invention this is achieved by providing a cleaning apparatus comprising a number of inlets from a scavenging air chamber, the inlets ending opposite the filter bags' outlets for filtered air, and also comprising a sealing plate which can be rotated by a driving means, the plate sealing the scavenging air inlets. The sealing plate is provided with one or several apertures which can be positioned to let scavenging air into the filter bags corresponding to the apertures in the sealing plate. The use of a rotating tightening plate simplifies the construction considerably compared to the use of flexible members.

In order not to affect the effectiness of the filter the sealing plate should preferably be designed with an aperture for each line of filter bags, so that only one filter bag in each line will be undergoing the cleaning process at any one time.

For optimum sealing the plate should preferably be made of a flexible material. At the same time it is necessary for the plate to possess a certain strength, as it will be subject to considerable torsional moment during rotation. Besides it will locally be affected by the scavenging air which might be compressed air. It would therefore be expedient to construct the sealing plate of thin, stainless steel.

The filter bag inlets against which the sealing plate slides would suitably be provided with a plastic sleeve to reduce friction.

The apertures in the sealing plate are out of phase with the scavenging inlets in such a way that they are positioned exactly between the inlets.

The cleaning apparatus is provided with a control device for the driving means of the sealing plate which causes the sealing plate to rotate a distance corresponding to the distance between two scavenging outlets, during which rotation the aperture in the tightening plate will pass one of the scavenging air outlets.

The control device primarily includes a timing relay which starts the driving means at certain intervals, and also includes a program disc co-rotating with the tightening plate and triggering a micro-switch for each rotation corresponding to the distance between two scavenging inlets. This method of control is attractive as it provides a simple yet direct steering of the tightening plate.

In the following the present invention will be described in detail with reference to the accompanying drawings, in which.

Figure 1:
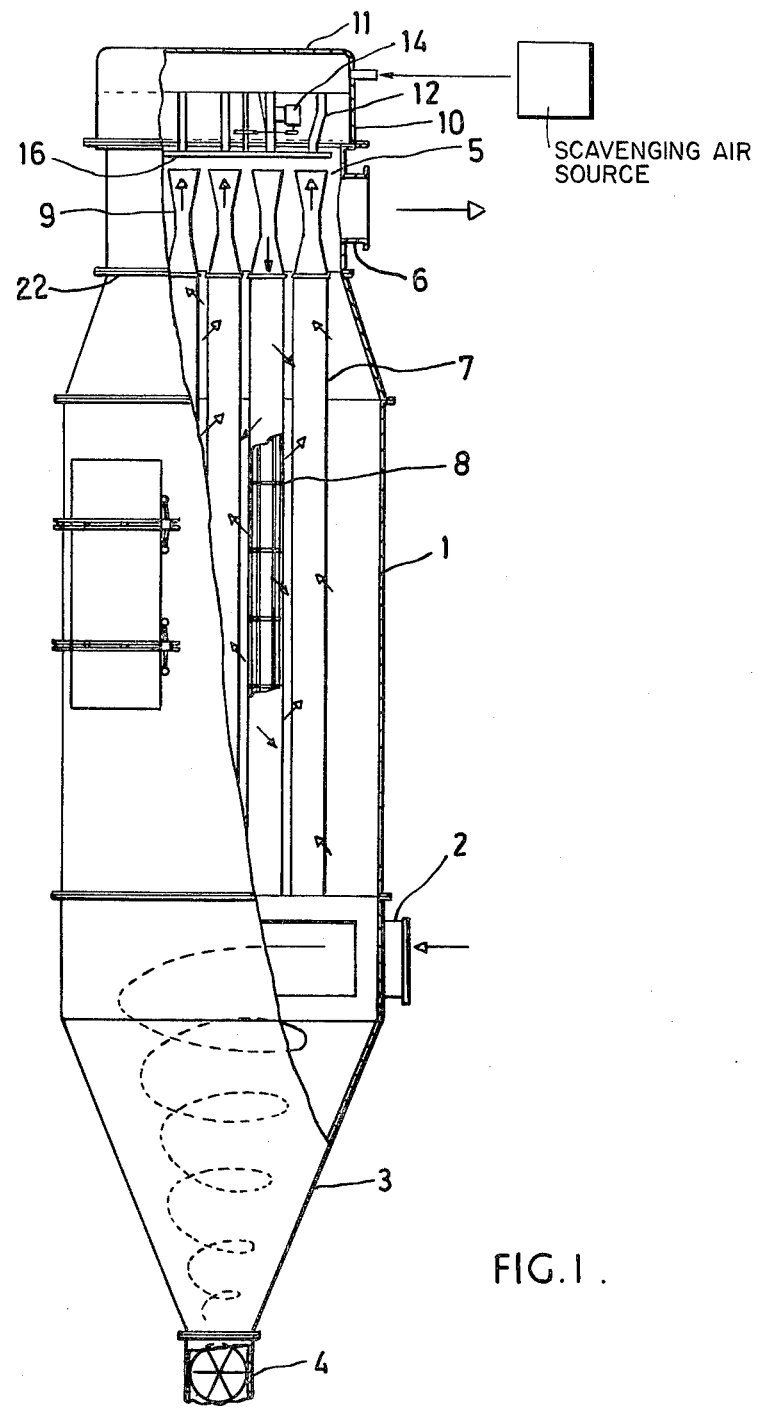
FIG. 1 is an elevational view of a cyclone housing made in accordance with the invention, with a portion thereof broken away to reveal the hose filter assembly therein.
Figure 2:
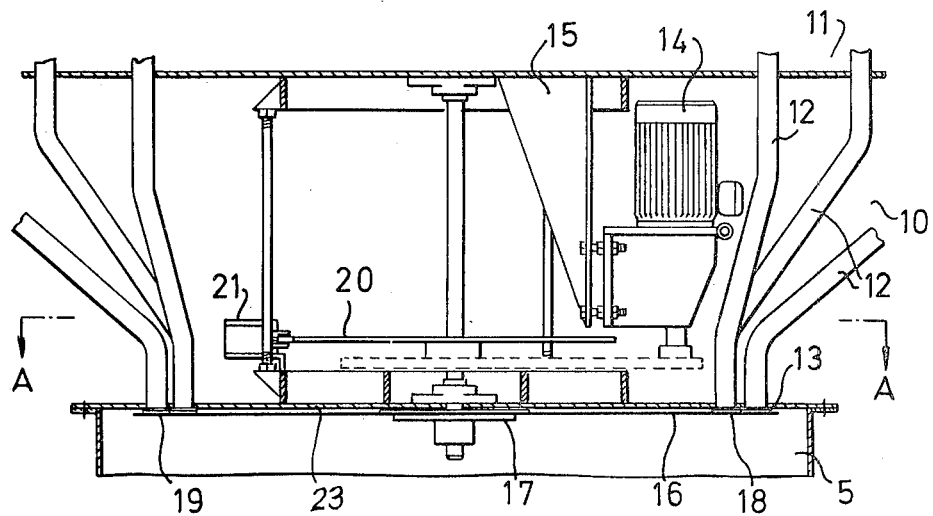
FIG. 2 is an enlarged sectional view of the cleaning apparatus within the upper portion of the cyclone housing shown in FIG. 1.

The cleaning apparatus according to the invention is shown in the drawings with a combined hose filter assembly and a tangential cyclone.

The cyclone comprises a cylindrical housing 1 with a tangential entrance 2 for dust-containing air. The lower end of the cyclone's cylindrical housing 1 is provided with a conical lower part 3 with a dust collector 4. The opposite, upper end of the cylindrical housing 1 is connected via the hose filter with a chamber 5 for the filtered air, with an outlet 6 for same. The tangential entrance 2 for dust-containing air creates the formation of a rotating spiral in the cyclone, whereas the cleaned air is drawn away through an inner spiral track. The particles suspeneded in the dusty air will, however, be forced to move towards the periphery of the cyclone under the influence of centrifugal forces. From there, secondary flow conditions among other things, will cause the particles to fall to the dust collector 4 at the pointed end of the cyclone. The cyclone will separate a large amount of material from the dusty air, thereby preventing the possibility of extreme loads on the hose filter.

The hose filter assembly comprises a number of filter bags or sleeves 7 suspended from the top wall 22 of the cylindrical upper part of the cyclone 1 and extending vertically through said cylindrical upper part in an arrangement of two concentric circular lines. The choice of filter material depends upon the temperature of the dusty air, concentration of dusty particles, particle size, and whether they are chemically aggressive, etc. The filter material may be i.e. wool, propylene, glass fibre. The pressure of the air within the cyclone housing 1 causes the air to pass through the walls of filter bags 7 to the interior thereof, and the filtered air flows through the filter bags to the filtered air chamber 5 and thence to the outlet 6. The air in the cyclone is thus taken out through the filter bags or sleeves 7, and the particles which were not separated in the cyclone are thus filtered out by the filter material. To avoid the collapse of the filter bags 7 when air is vacuumed or pressed through same, the filter bags are provided with and supported by a wire grid 8. A layer of particles quickly forms on the filter material, whereby the filtering effect is increased and wear of the filter bags 7 reduced. The increased choking and loss of pressure make it necessary to remove the particles once the layer reaches a certain depth.

In order to remove the accumulation of filtered-out particles clinging to the outer walls of the filter bags, the filter bags 7 are cleaned by the introduction into the interior thereof, for a short period, of a counter-flow of scavenging or cleaning air in a direction opposite to the direction of flow of the filtered air through the filter bags 7. The particles clinging to the outer wall of the filter bags are blown, and partly because of the shock effect, shaken off the wall, and will fall because of gravity, and also helped by secondary air flow, along the sleeve walls down to the pointed end of the cyclone and the dust collector 4.

The ceiling 22 of the upper part of the cyclone housing 1 also serves as the floor of the overlying filtered air chamber 5, and separates the chamber 5 from the interior of housing 1. In the ceiling 22 are mounted a number of upstanding venturi tubes 9 corresponding to the number of filter bags 7, the venturi tubes 9 being provided with sockets extending through the ceiling 22 of the cyclone and depending therefrom, to which sockets the filter bags 7 are fastened with a sleeve. Above the chamber for filtered air 5 there is an motor chamber 10, and superimposed thereon a chamber 11 for scavenging air, which chamber 11 may be designed as a pressure chamber if compressed air is used for the scavenging of the filter bags 7. The pressure chamber 11 and the chamber 5 for filtered air are connected through a number of tube sections 12, one for each filter bag 7. The tube sections 12 are by means of nylon sleeves 13 fastened to the bottom wall 23 of the motor chamber 1o, which bottom wall 23 also forms the ceiling of the chamber 5 for filtered air.

Figure 3:
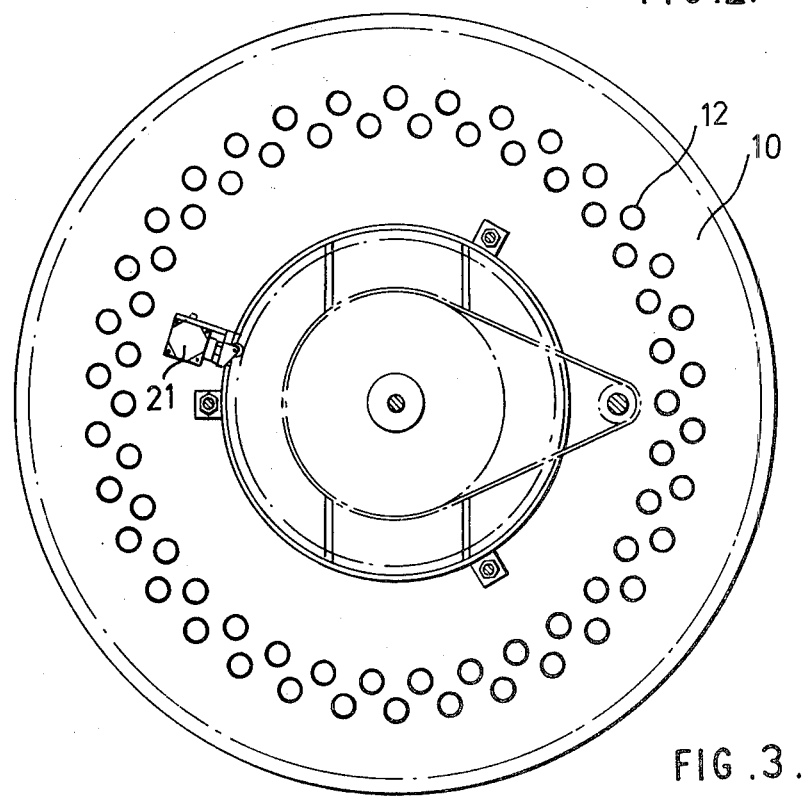
FIG. 3 is a cross-section through the cleaning apparatus taken on the line A—A of FIG. 2.

The tube sections 12 are arranged in a pattern of two concentric circular lines, as shown in FIG. 3, corresponding to the circular arrangement of the venturi tubes 9 and their attached filter bags 7. The venturi tubes 9 are so arranged that each is located below and in registry with a respective tube section 12, as shown in FIG. 1, so that scavenging or cleaning air emitted by each tube section 12 will be directed into the open top end of the underlying venturi tube 9. The top open ends of the venturi tubes 9 terminate a short distance below the bottom ends of the tube section 12 and the nylon sleeves 13 thereon, providing a space, as shown in FIG. 1, through which filtered air may escape out of the top ends of the venturi tubes 9 and flow to the filtered air outlet 6.

In the motor chamber 10 a gear motor 14 is suspended by mountings 15 in the ceiling of the chamber, the gear motor 14 driving a circular sealing plate 16 suspended in a bearing 17 and freely rotating in the ceiling 23 of chamber 5 for filtered air, the ceiling at the same time being the floors of the motor chamber 10. The circular sealing plate 16 slides against the shoulders of the nylon sleeves 13, with which the scavenging air tube sections 12 are fastened, and at the same time presses against these sleeves 13 to provide a seal over the bottom open ends of the tube sections 12, thereby normally preventing the flow of scavenging air therefrom. The embodiment shows two lines of filter bags suspended concentrically. The circular sealing plate 16 is provided with two apertures 18 and 19, one for each of the two lines of filter bags 7. The gear motor 14 is controlled by a timing relay which starts the gear motor 14 and drives the sealing plate 16 through a distance corresponding to the distance between two successive tube sections 12 for the scavenging air. Each time the sealing plate 16 is driven in this manner, the aperture 18 is moved into registry with the bottom open end of one of the tube sections 12 in the inner circular line, as shown in FIG. 3, for a short period, permitting scavenging air to flow out of the tube section and into the underlying venturi tube 9 and its attached filter bag 7, thereby introducing a flow of cleaning air in the filter bag in a direction reverse to the direction of flow of the filtered air therein, which cleaning air dislodges the accumulation of particles from the outer wall of the filter bag. At the same time, the other aperture 19 moves into registry with one of the tube sections 12 in the outer circular line, which tube section is diametrically opposed to the tube section registering with the aperture 18, as shown in FIG. 3.

Thus only two filter bags 7 are being cleaned at any one time, for which reason the efficiency of the filter is not seriously affected, in contrast to the filter systems where all filter bags 7 are cleaned at the same time. Therefore the filter is in operation without interruptions at the same time as a continuous cleaning of the filter bags 7 is going on. As the filters are subjected to continous cleaning, and as the method does not allow much dust to accumulate on the bags, it will not be necessary to use compressed air as such but it suffices to use a flow of scavenging or cleaning air at only a slight pressure. If the apparatus is to process air at high temperatures it is feasible to locate the motor chamber 10 and the pressure chamber 11 at some distance from the actual apparatus, so that the two components are not subjected to high temperatures. In itself it is not necessary to provide a separate motor chamber 10 and pressure room 11 as it is possible to combine the two chambers in one unit.

The control device for the motor 14 includes a timing relay which starts the motor at periodic intervals, and also a program disc 20 mounted on the shaft of the sealing plate 16 and rotatable with the sealing plate to actuate a micro-switch 21 each time the sealing plate is rotated through a distance equal to the distance between two successive tube sections 12. The program disc 20 has a cam edge which activates the micro-switch 21 in order to stop the motor 14 when the sealing plate 16 is in a position in which the apertures 18 and 19 are located between two successive tube sections 12 and out of registry therewith. After a preselected time interval, the timing relay again starts the motor 14 causing the sealing plate 16 to rotate slowly so that the apertures 18 and 19 traverse two of the tube sections 12 to cause a stream of cleaning air to be directed into the underlying venturi tubes 9, until the motor is again halted by the micro-switch 21.

What we claim is:

1. In a hose filter assembly including a plurality of filter bags having open outlet ends arranged in at least one circular line and in which exterior dust-containing air is directed through the walls of said filter bags to provide a flow of filtered air within the interior of said filter bags to the open outlet ends thereof and thence to a filtered air outlet, with filtered out dust particles clinging to the outer wall surfaces of said filter bags, cleaning apparatus for removing the accumulation of particles from the walls of said filter bags by the introduction of a flow of scavenging air into the open outlet ends of said filter bags in a direction opposite to the direction of flow of filtered air therein, said cleaning apparatus comprising:

an enclosed scavenging air chamber connected to a source of scavenging air and having a plurality of outlet members arranged in at least one circular line and having open outlet ends registering with and spaced from the open outlet ends of the respective filter bags, a rotatable sealing plate mounted adjacent the open ends of said outlet members and sealing the same against passage of scavenging air therethrough, drive means for rotating said sealing plate, and an aperture in said sealing plate positioned to register successively with the outlet members in each circular line as said sealing plate is rotated, whereby a flow of scavenging air is introduced into the open outlet end of each of said filter bags successively.

2. The assembly according to claim 1 further including two concentric circular lines of said filter bags and two concentric circular lines of said outlet members for said scavaging air chamber, and in which said sealing plate has two of said apertures, each registering with a respective line of said outlet members.

3. The assembly according to claim 1 in which said sealing plate is a flexible, thin stainless steel plate mounted to press against the ends of said outlet members to provide a seal thereon.

4. The assembly according to claim 1 in which a plastic sleeve is mounted on the end of each of said outlet members, said sealing plate passing against said plastic sleeves to provide a seal on the ends of said outlet members, and sliding against said plastic sleeves as said sealing plate is rotated.

5. The assembly according to claim 1 which also includes control means for controlling the operation of said drive means to rotate said sealing plate in periodic intervals through a distance equal to the distance between two successive scavenging air outlet members, during which movement the aperture in said sealing plate traverses one of said outlet members.

6. The assembly according to claim 5 in which said control means comprises a timing relay for energizing said drive means at periodic intervals, a micro-switch for deenergizing said drive means, and a program disc mounted to rotate with said sealing plate and adapted to actuate said micro-switch each time said sealing plate rotates through a distance equal to the distance between two successive scavenging air outlet members.

7. The assembly according to claim 1 in which said hose filter assembly includes a housing having a lower cyclone chamber in which exterior dust-containing air is admitted tangentially for removal of dust particles by cyclone action, and a filtered air chamber located above said cyclone chamber and separated therefrom by a wall, said filter bags extending vertically through said cyclone chamber and communicating at their upper ends with said filtered air chamber through said wall, said filtered air chamber having an outlet for filtered air, said scavenging air chamber and said drive means being located above said filtered air chamber and being separated therefrom.

8. The assembly according to claim 7 which a venturi tube is mounted on the top open outlet end of each of said filter bags, each of said venturi tubes extending upwardly through said filtered air chamber and terminating a short distance below a respective outlet member of said scavenging air chamber.

* * * * *